United States Patent
Lim et al.

(10) Patent No.: US 8,385,279 B2
(45) Date of Patent: *Feb. 26, 2013

(54) RESOURCE ALLOCATION APPARATUS AND METHOD FOR REDUCING OVERHEAD IN MOBILE COMMUNICATION SYSTEM

(75) Inventors: Jun-Sung Lim, Seoul (KR); Se-Ho Kim, Seoul (KR); Hee-Won Kang, Seongnam-si (KR); Ho-Kyu Choi, Seongnam-si (KR); Jae-Weon Cho, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 724 days.

This patent is subject to a terminal disclaimer.

(21) Appl. No.: 12/583,827

(22) Filed: Aug. 26, 2009

(65) Prior Publication Data

US 2009/0323626 A1    Dec. 31, 2009

Related U.S. Application Data

(63) Continuation-in-part of application No. 12/386,471, filed on Apr. 17, 2009.

(30) Foreign Application Priority Data

Apr. 17, 2008   (KR) .................. 10-2008-0035559
Apr. 17, 2009   (KR) .................. 10-2009-0033460

(51) Int. Cl.
*H04W 4/00*   (2009.01)
*H04J 3/16*   (2006.01)
*H04J 3/22*   (2006.01)

(52) U.S. Cl. .......... 370/329; 370/437; 370/468
(58) Field of Classification Search .............. 370/329, 370/437, 468
See application file for complete search history.

(56) References Cited

U.S. PATENT DOCUMENTS

2009/0262691 A1*  10/2009  Lim et al. .............. 370/329

FOREIGN PATENT DOCUMENTS

| KR | 1020060078667 A | 7/2006 |
| KR | 1020070063920 A | 6/2007 |
| KR | 1020070091504 A | 9/2007 |
| KR | 1020080000206 A | 1/2008 |

OTHER PUBLICATIONS

International Search Report dated Dec. 16, 2009 in connection with PCT Application No, PCT/KR2009/002017.

* cited by examiner

*Primary Examiner* — Ronald Abelson

(57) ABSTRACT

An operating method of a base station for changing a fixed resource allocation to reduce overhead in a mobile communication system includes calculating a total amount of resources allocated to a corresponding subframe in a period of a corresponding fixed allocation resource; when the total amount of the resources allocated to the corresponding subframe is greater than a threshold, temporarily canceling one or more corresponding fixed allocation resources to make the total amount of the resources allocated to the corresponding subframe less than or equal to the threshold; and reallocating the one or more canceled fixed allocation resources according to a corresponding rule.

30 Claims, 15 Drawing Sheets

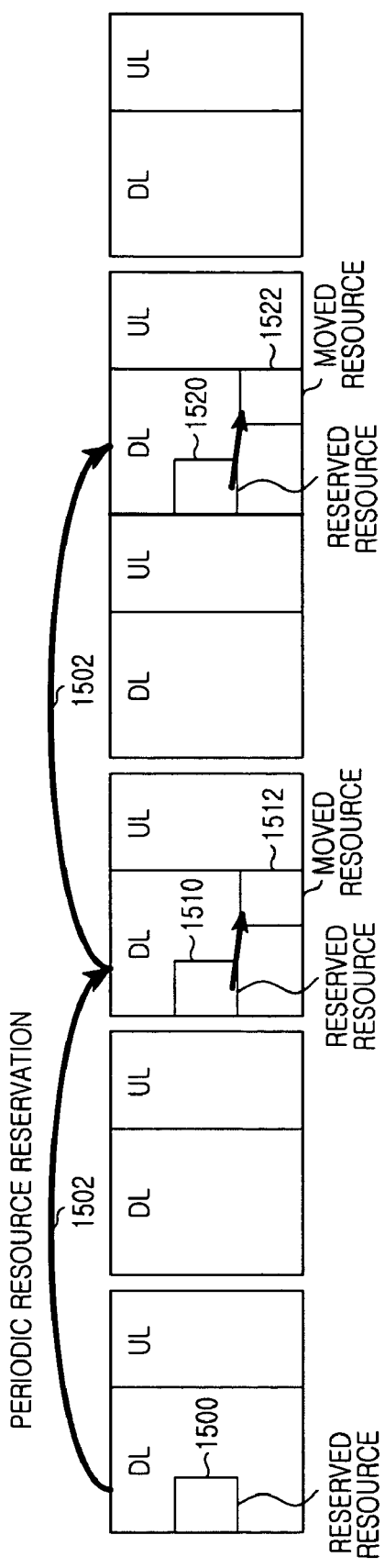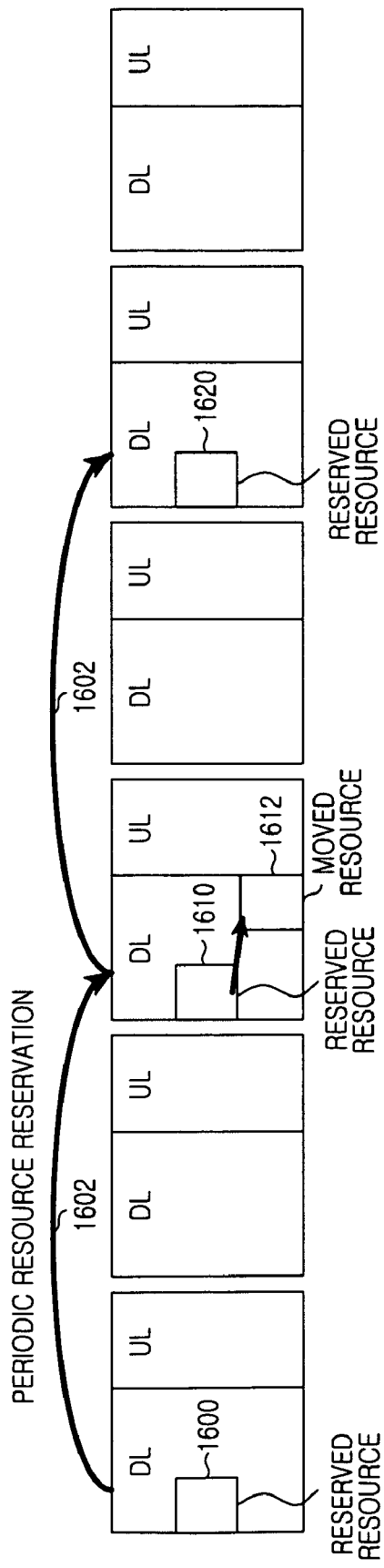

RESOURCE ALLOCATION APPARATUS AND METHOD FOR REDUCING OVERHEAD IN MOBILE COMMUNICATION SYSTEM

CROSS-REFERENCE TO RELATED APPLICATION(S) AND CLAIM OF PRIORITY

The present application is a continuation in-part application of the U.S. patent application Ser. No. 12/386,471 filed on Apr. 17, 2009, which claims the benefit under 35 U.S.C. §119 to an application filed in the Korean Intellectual Property Office on Apr. 17, 2008 and assigned Serial No. 10-2008-0035559, and the Korean Intellectual Property Office on Apr. 17, 2009 and assigned Serial No. 10-2009-0033460, the entire disclosure of which is hereby incorporated by reference.

TECHNICAL FIELD OF THE INVENTION

The present invention relates generally to a mobile communication system for resource allocation. More particularly, the present invention relates to a resource allocation changing apparatus and method for reducing overhead in a mobile communication system.

BACKGROUND OF THE INVENTION

In accordance with increasing domestic and foreign attention on a $4^{th}$-Generation (4G) mobile communication, research is being conducted on systems for meeting the requirements of the 4G mobile communication. Particularly, an Orthogonal Frequency Division Multiplexing (OFDM) scheme, which features high transmission efficiency and a simple channel equalization, attracts attention as one of the suitable schemes for the 4G mobile communication system. The OFDM scheme is adopted as a wireless transmission standard for the Institute of Electrical and Electronics Engineers (IEEE) 802.16 and other systems.

An Orthogonal Frequency Division Multiple Access (OFDMA) scheme, which allocates different subcarriers per the user, transmits data by splitting the frequency band in use into a plurality of small frequency bands (that is, into subchannels and times).

Meanwhile, for the time/frequency resource allocation in the OFDMA based mobile communication system, the resources are allocated using a scheduler, and the allocation information is transmitted using a control signal. To reduce overhead of the control information, the previously allocated region without particular control information can be reused. That is, the resource region of every frame is fixedly allocated and used until the resource region is changed or released separately.

Since a period of using the previously allocated region differs in the fixed allocation, the same resource of a specific time point may be allocated to multiple users at the same time. At this time, the scheduler changes the resource allocation locations of the corresponding users to make them recognize their changed resource allocation regions. When transmitting the changed information, the scheduler needs to send additional control information.

However, conventional methods transmit the additional control information of the changed resource allocation region without taking into account various possible resource collisions in the fixed resource allocation, and thus may suffer the overhead.

Thus, there is a need for an apparatus and a method for efficiently transmitting the control information required to change the fixed resource allocation region in the mobile communication system.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to address at least the above mentioned problems and/or disadvantages and to provide at least the advantages described below. Accordingly, an aspect of the present invention is to provide an apparatus and a method for a fixed resource allocation in a mobile communication system.

Another aspect of the present invention is to provide a resource allocation apparatus and method for reducing overhead when a fixed resource allocation is changed in a mobile communication system.

Yet another aspect of the present invention is to provide an apparatus and a method for determining a roll-over resource in a fixed resource allocation of a mobile communication system.

According to one aspect of the present invention, an operating method of a base station for changing a fixed resource allocation to reduce overhead in a mobile communication system includes, when there is need to change the fixed resource allocation, calculating necessary control information amounts with respect to at least two resource allocation changing methods respectively; selecting a resource allocation changing method that requires the least amount of control information; and transmitting a control information required for the resource allocation change to at least one terminal.

According to another aspect of the present invention, an operating method of a terminal for changing a fixed resource allocation to reduce overhead in a mobile communication system includes, when receiving a fixed allocation change control message, determining a corresponding resource allocation changing method; determining a location of a fixed allocation resource changed according to the corresponding resource allocation region changing method; and receiving or transmitting a corresponding traffic from the location of the changed fixed allocation resource.

According to yet another aspect of the present invention, an apparatus of a base station for changing a fixed resource allocation to reduce overhead in a mobile communication system includes a controller for, when there is need to change the fixed resource allocation, calculating necessary control information amounts with respect to at least two resource allocation changing methods; and a resource allocator for selecting a resource allocation changing method which requires the least amount of control information; and transmitting a message comprising control information required for the resource allocation change to at least one terminal.

According to still another aspect of the present invention, an apparatus of a terminal for changing a fixed resource allocation to reduce overhead in a mobile communication system includes a resource allocation checker for, when receiving a fixed allocation change control message, determining a corresponding resource allocation changing method and locating a fixed allocation resource changed according to the corresponding resource allocation region changing method; and a controller for receiving a corresponding traffic from the location of the changed fixed allocation resource.

According to a further aspect of the present invention, an operating method of a base station for changing a fixed resource allocation to reduce overhead in temporarily canceling one or more corresponding fixed allocation resources; and reallocating the one or more canceled fixed allocation resources according to a corresponding rule.

According to a further aspect of the present invention, an operating method of a terminal for changing a fixed resource allocation to reduce overhead in a mobile communication system includes receiving information to change a fixed allocation resource in a corresponding fixed allocation resource cycle; locating a fixed allocation resource changed by a corresponding rule based on the information to change the fixed allocation resource; and receiving traffic in the changed fixed allocation resource location.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments the present invention will become more apparent from the following detailed description taken in conjunction with the accompanying drawings, in which:

FIG. 15 illustrates a timing of the previous periodic resource allocation according to a roll-over scheme according to an exemplary embodiment of the present invention;

FIG. 16 illustrates a timing of the previous periodic resource allocation according to a roll-over scheme according to another exemplary embodiment of the present invention;

Throughout the drawings, like reference numerals will be understood to refer to like parts, components and structures.

DETAILED DESCRIPTION OF EXEMPLARY EMBODIMENTS

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Preferred embodiments of the present invention will be described herein below with reference to the accompanying drawings. In the following description, well-known functions or constructions are not described in detail since they would obscure the invention in unnecessary detail. Terminologies described below are defined with consideration of functions in the present invention, and can change depending on the intention or practice of a user or operator. Therefore, the definitions should be determined on the basis of the descriptions over the specification.

Exemplary embodiments of the present invention provide an apparatus and a method for changing a fixed resource allocation region to reduce overhead in a mobile communication system, and an apparatus and a method for determining a roll-over resource in the fixed resource allocation. While a broadband wireless communication system (the Institute of Electrical and Electronics Engineers (IEEE) 802.16 system) is illustrated in FIGS. 1 through 17, the present invention is applicable to other wireless communication systems.

Hereinafter, a certain time interval (a symbol interval) including a plurality of subcarriers constituting one subchannel is defined as a slot in the broadband wireless communication system. A plurality of slots constitutes one radio resource unit. That is, single frame is composed of a plurality of subframes.

Figure 1:
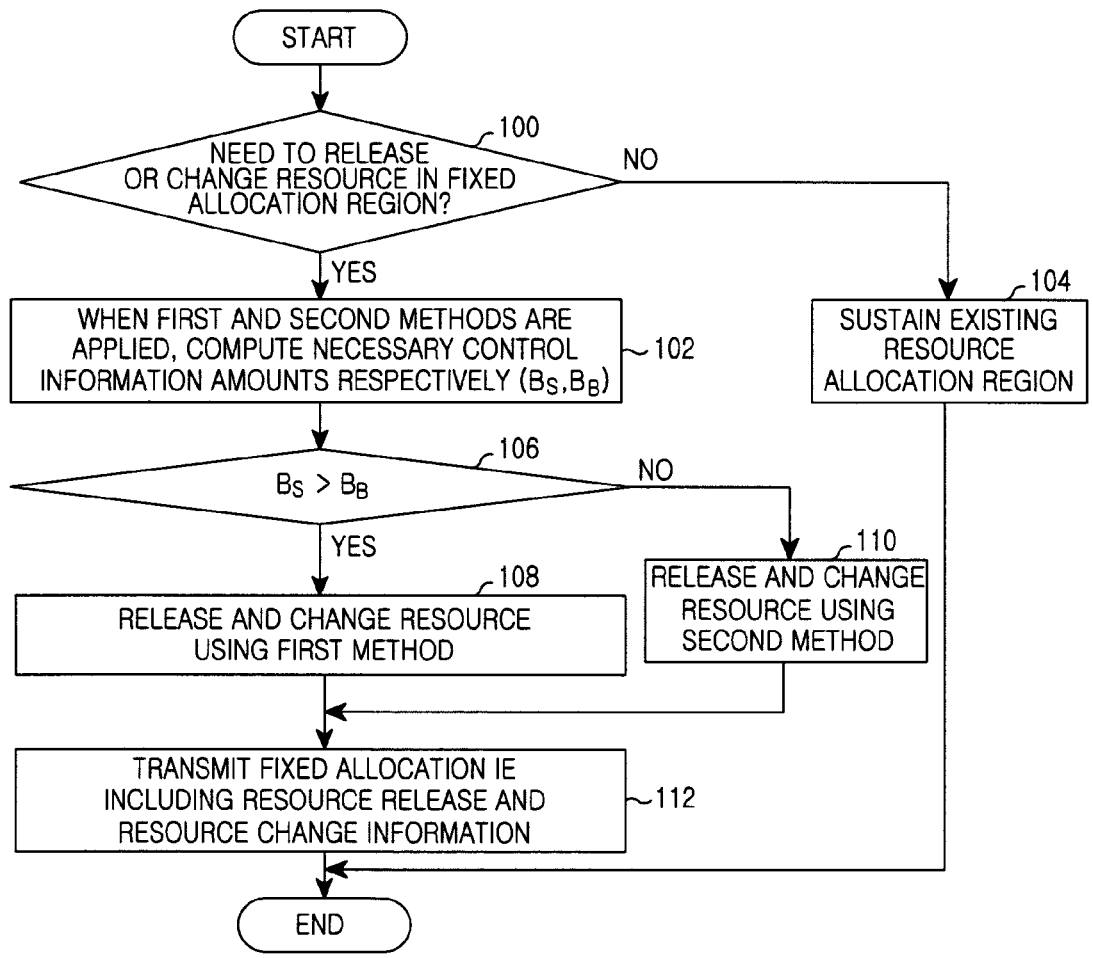
FIG. 1 illustrates operations of a base station for changing a fixed resource allocation region in a broadband wireless communication system according to an exemplary embodiment of the present invention.

FIG. 1 illustrates a flowchart outlining operations of a base station for changing a fixed resource allocation region in a broadband wireless communication system according to an exemplary embodiment of the present invention.

In step 100, the base station determines whether it is necessary to release or change the resource in the fixed resource allocation region. When there is no need to release or change the resource, the base station sustains the existing resource allocation region in step 104.

When a resource release or change is required, in step 102, the base station calculates control information amounts $B_b$ and $B_s$ required to release and change the resource when a first method and a second method, respectively, are adopted. Herein, $B_b$ denotes the control information amount required for the first method, and $B_s$ denotes the control information amount required for the second method.

Alternatively, when the resource release or change is not required, in step 104, the base station sustains the existing resource allocation region. To change other resource allocation regions excluding one A of resource allocation regions collided at a scheduler, the first method alters the collided resource regions to un-collided regions by changing the slot offsets of the collided resource allocation regions. At this time, the control information transmitted requires identifiers of the collided resource regions and the slot offset value to change. When the first method is applied, the control information amount fundamentally required is expressed as Equation 1:

$$B_b = N_b(X+Y)[bits].$$ [Eqn. 1]

Figure 4:
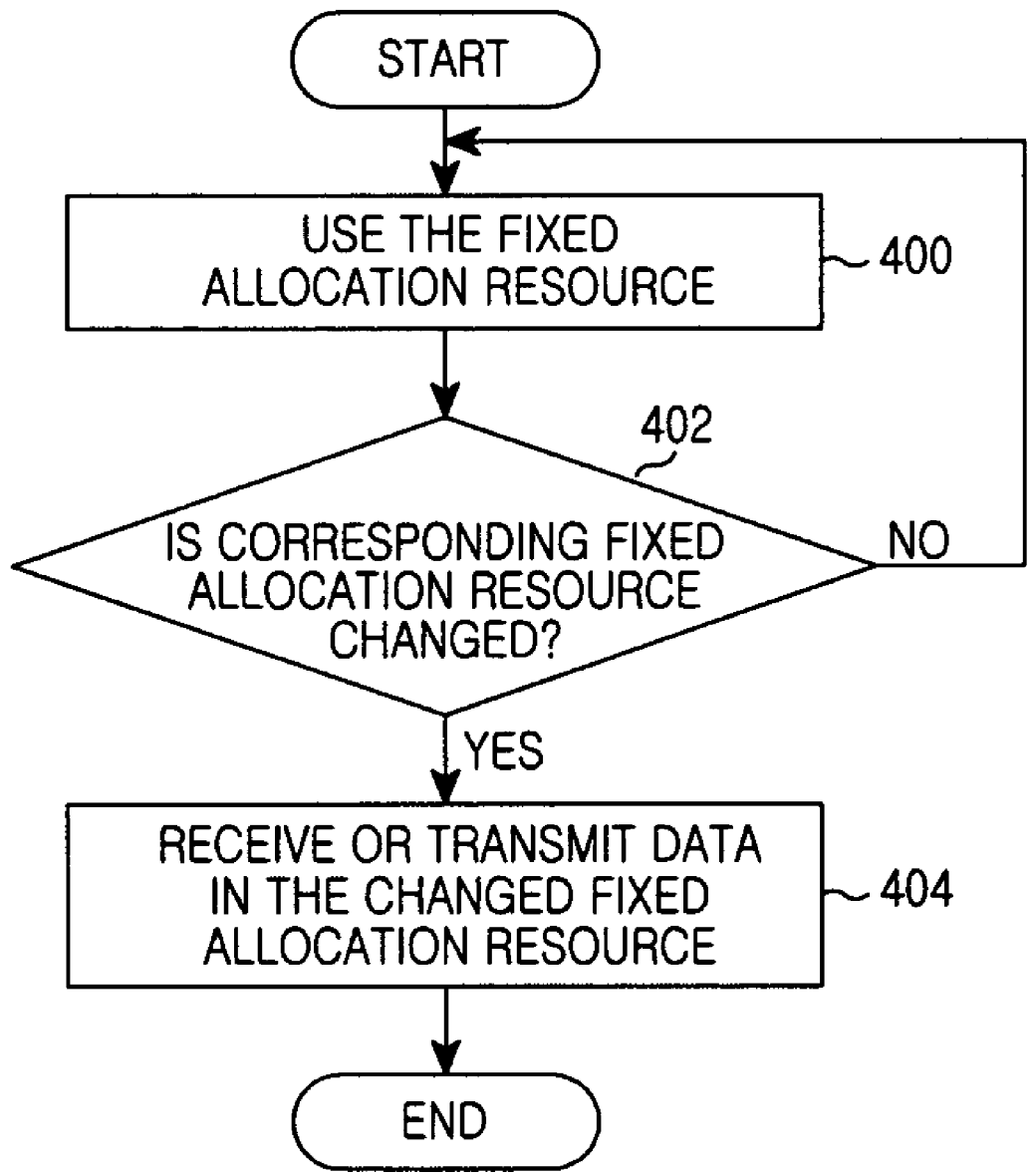
FIG. 4 illustrates operations of the terminal for the roll-over in the fixed resource allocation in the broadband wireless communication system according to an exemplary embodiment of the present invention.

In Equation 1, $N_b$ denotes the number of resource regions to be changed, X denotes the number of bits required to represent a traffic Identifier (ID), and Y denotes the number of bits required to represent the slot offset. The first method is illustrated in FIG. 4.

To change other resource allocation regions excluding the one A of resource allocation regions collided at the scheduler, the second method sequentially allocates the other allocation resource regions excluding the previously allocated regions including A as many as the allocated slots. Control information transmitted carries a bitmap indicative of unallocated resources to be filled with the collided resource regions and the previously allocated regions, traffic IDs of the resource regions to be changed, and the number of the allocated slots. Accordingly, when the collided resource is considerable, the slot not adjacent can be allocated. Using the second method, the control information amount fundamentally required is expressed as Equation 2:

$$B_s = N_s(X+Y)+Z[bits].$$ [Eqn. 2]

Figure 5:
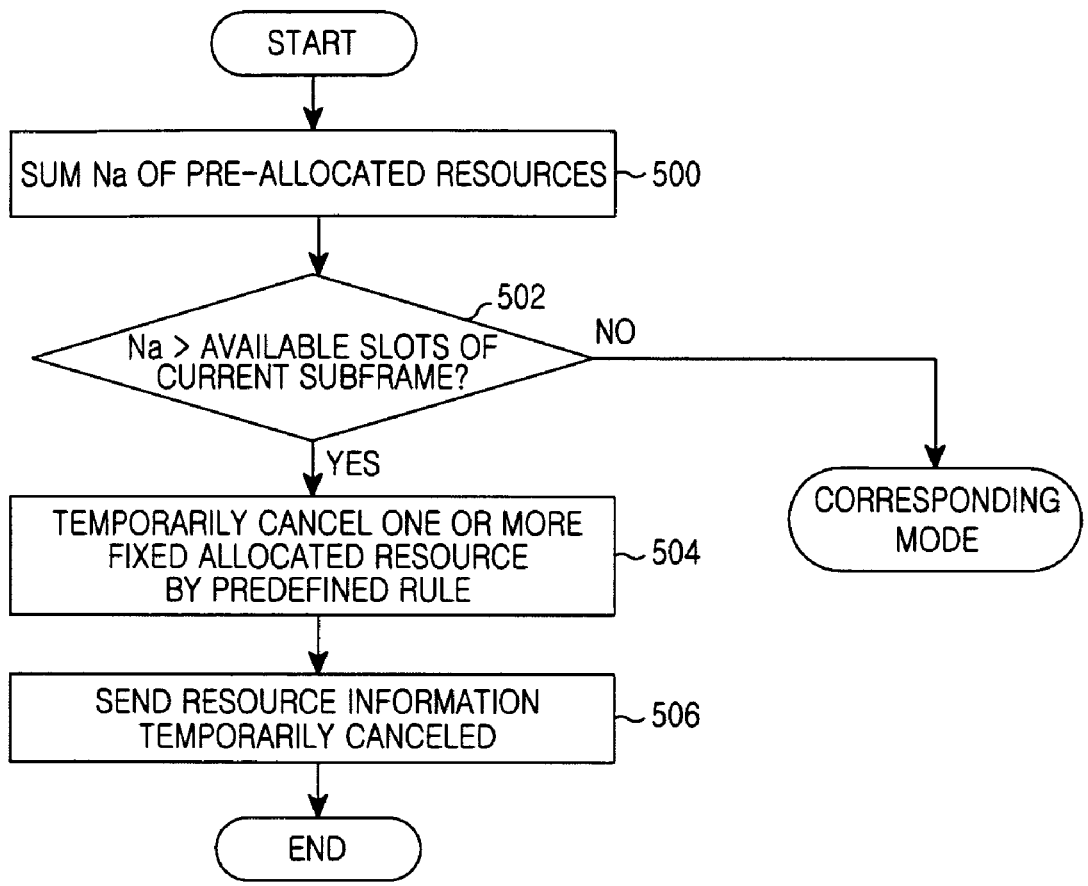
FIG. 5 illustrates operations of the base station for the roll-over in the fixed resource allocation in the broadband wireless communication system according to an exemplary embodiment of the present invention.

In Equation 2, $N_s$ denotes the number of resource regions to be changed, X denotes the number of bits required to represent the traffic ID, Y denotes the number of bits required to represent the duration, and Z denotes the number of bits required to constitute the bitmap. The second method is illustrated in FIG. 5.

In step 106, the base station compares the information amount $B_s$ required for the resource release or change of the second method with the information amount $B_b$ required for the resource release or change of the first method. When $B_s$ is greater than $B_b$, the base station releases or changes the resource using the first method in step 108. When $B_s$ is less than $B_b$, the base station releases or changes the resource using the second method in step 110. When $B_s$ is equal to $B_b$, the base station can release or change the resource by selecting either the first method or the second method as the default value.

In step 112, the base station transmits a fixed allocation Information Element (IE) message including the resource release and resource change information. Herein, the control information contained in the fixed allocation IE message can be transmitted through a joint coding decodable by every user, or through a separate coding decodable by particular user(s).

The fixed allocation IE message format is shown in Table 1.

TABLE 1

| Content | # of bits | Comment |
| --- | --- | --- |
| Length | X bits | Indicate # of bits required for resource change message |
| Bitmap indicator | 1 bit | 1->Exist bitmap, 0->No exist bitmap |

If bitmap indicator = 1
Slot bitmap (length = # of total slots)
# of slot offsets or durations
For i=1: # of slot offsets or durations
Traffic ID
Slot offset or Duration Herein, the control information for the resource allocation region change includes a control information length, a bitmap (required when the second method is applied), a slot offset/duration information, and so forth. The bitmap is constituted by representing the previously allocated slot as '1' (or '0') and previously unallocated region as '0' (or '1') per slot. The slots indicated by '0' are allocated in sequence by the corresponding duration in the order of the traffic of the changed slot offset. The slot offset/duration information includes the traffic ID required for the location change of each resource region and the information required for the location change.

When the collided resource region is changed using the second method, the bitmap indicator is set to '1'. The bitmap information follows the bitmap indicator. IDs of the traffics to be changed and the number of the allocated resources are transmitted in the slot offset or duration. In the first method, the bitmap indicator is set to '0', and the offset or duration carries the IDs of the traffics to be changed and the slot offset value of the changed resource allocation region without the bitmap information.

Next, the base station finishes this process for changing the fixed resource allocation region.

While the two fixed resource allocation changing methods (the first method and the second method) are explained in FIG. 1, n-ary fixed resource allocation changing methods can be adopted. Of the n-ary fixed resource allocation changing methods, a method having the least amount of information is selected by computing the information amount required for the smallest resource release or change, and thus the fixed allocation IE message is transmitted.

Figure 2:
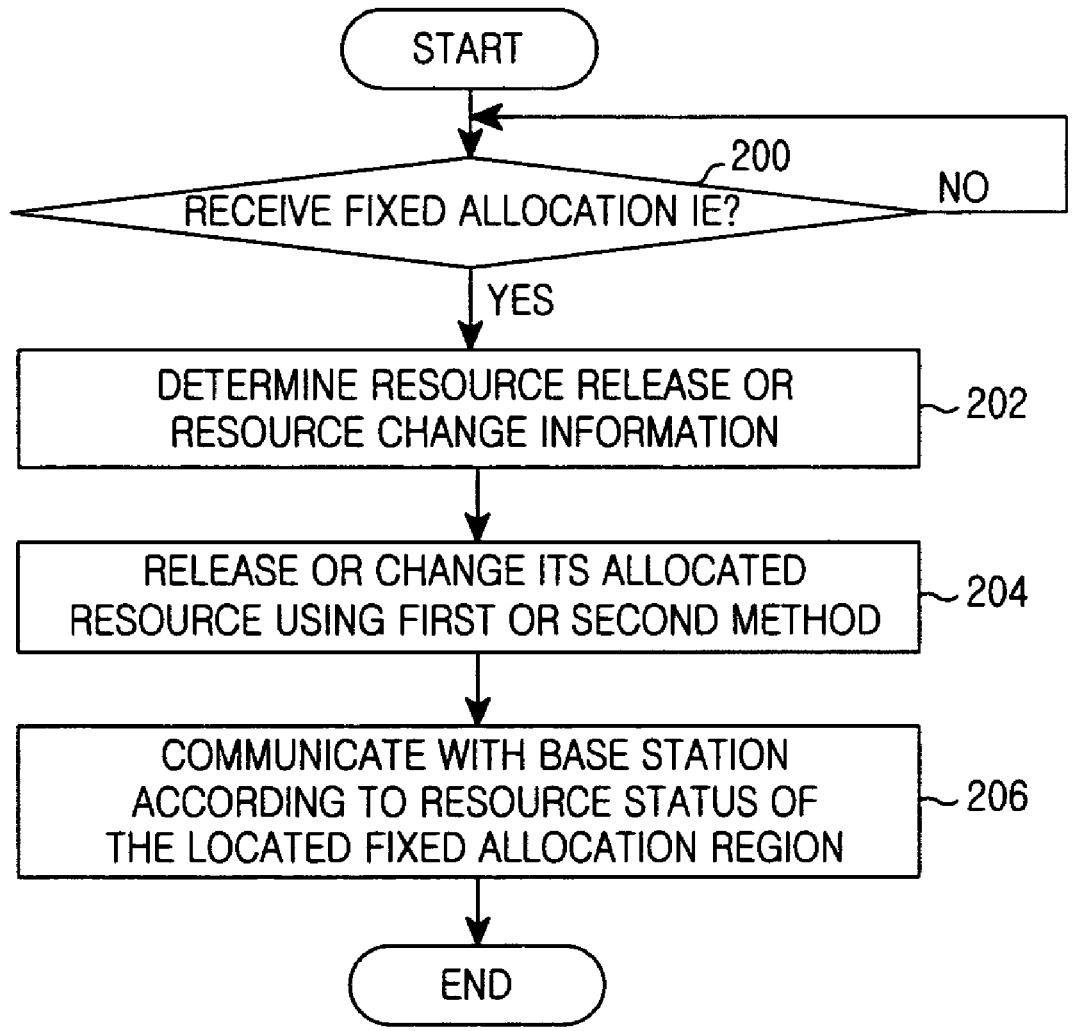
FIG. 2 illustrates operations of a terminal for changing the fixed resource allocation region in the broadband wireless communication system according to an exemplary embodiment of the present invention.

FIG. 2 illustrates a flowchart outlining operations of a terminal for changing the fixed resource allocation region in the broadband wireless communication system according to an exemplary embodiment of the present invention.

Upon receiving the fixed allocation IE message in step 200, the terminal determines the resource release or change information in step 202 (see Table 1).

In step 204, the terminal releases or changes its allocated resource according to the first method or the second method based on the bitmap indicator information contained in the fixed allocation IE message.

In step 206, the terminal communicates with the base station according to the fixed resource allocation change.

Next, the terminal finishes this process of changing the fixed resource allocation region.

Figure 3:
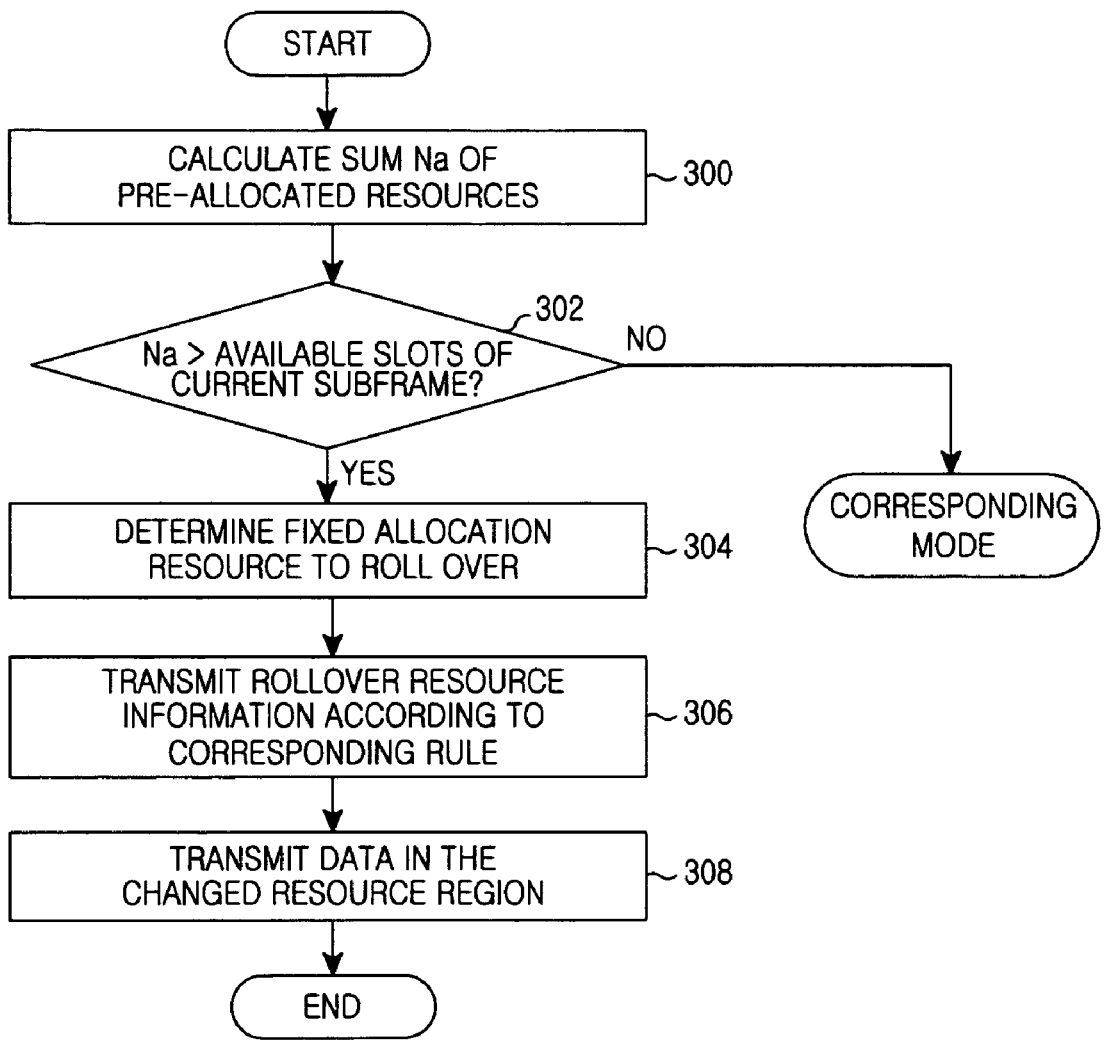
FIG. 3 illustrates operations of the base station for roll-over in the fixed resource allocation in the broadband wireless communication system according to an exemplary embodiment of the present invention.

FIG. 3 illustrates a flowchart of operations of the base station for the roll-over resource in the fixed resource allocation in the broadband wireless communication system according to an exemplary embodiment of the present invention.

In step 300, the base station calculates the sum $N_a$ of the pre-allocated resources at the corresponding time point.

If the sum $N_a$ of the pre-allocated resources is greater than the available slots of the current subframe in step 302, the base station determines the fixed allocation resource to be rolled over in step 304. By contrast, if the sum $N_a$ of the pre-allocated resources is less than or equal to the available slots of the current subframe in step 302, the base station operates in the corresponding mode.

To determine the resource to be rolled over among the entire pre-allocated region, at least one resource region to be rolled over can be selected according to ascending order of the size of the allocated resource regions collided at the scheduler, until $N_a$ becomes less than or equal to the available resource regions of the current subframe. Alternatively, at least one resource region to be rolled over can be determined by the order of data priority.

According to another embodiment, at least one resource region to be rolled over is determined by considering a capability of the scheduler. That is, the scheduler determines that a resource is allocated in a certain resource region of a subframe after passing how many resource regions of subframes.

For example, if, in the base station, an overhead for dealing with a roller-over of a fixed allocation resource with a temporary non-use of a fixed allocation resource in a subframe is less than an overhead for dealing with a fixed allocation for the fixed allocation resource in the subframe, the scheduler determines a roll-over of the fixed allocation resource to pass at least one resource region of subframe. The location change of the rolled-over fixed allocation resource is illustrated in FIG. 10 through FIG. 14. In other words, the change of the resource region in which the rolled-over resource is allocated is illustrated in FIG. 10 through FIG. 14.

In step 306, the base station transmits a roll-over indication message including the information relating to the roll-over resource regions (e.g., ID of the traffic rolled over, transmission point of the roll-over traffic) to the corresponding terminal according to the relevant rule.

The message instructing the roll over is transmitted as part of the resource allocation change message of Table 2, or only the corresponding message is transmitted independently.

Herein, the message indicative of the roll over is included to the resource allocation change message. A user of the same ID as the traffic ID of the roll-over message recognizes that its pre-allocated resource region is canceled in the current subframe. Note that the rolled-over resource region is canceled solely in the current subframe, not permanently.

TABLE 2

| Content | # of bits | Comment |
| --- | --- | --- |
| Length | X bits | Indicate # of bits required for resource change message |
| Bitmap indicator | 1 bit | 1->Exist bitmap, 0->No exist bitmap |

Figure 9:
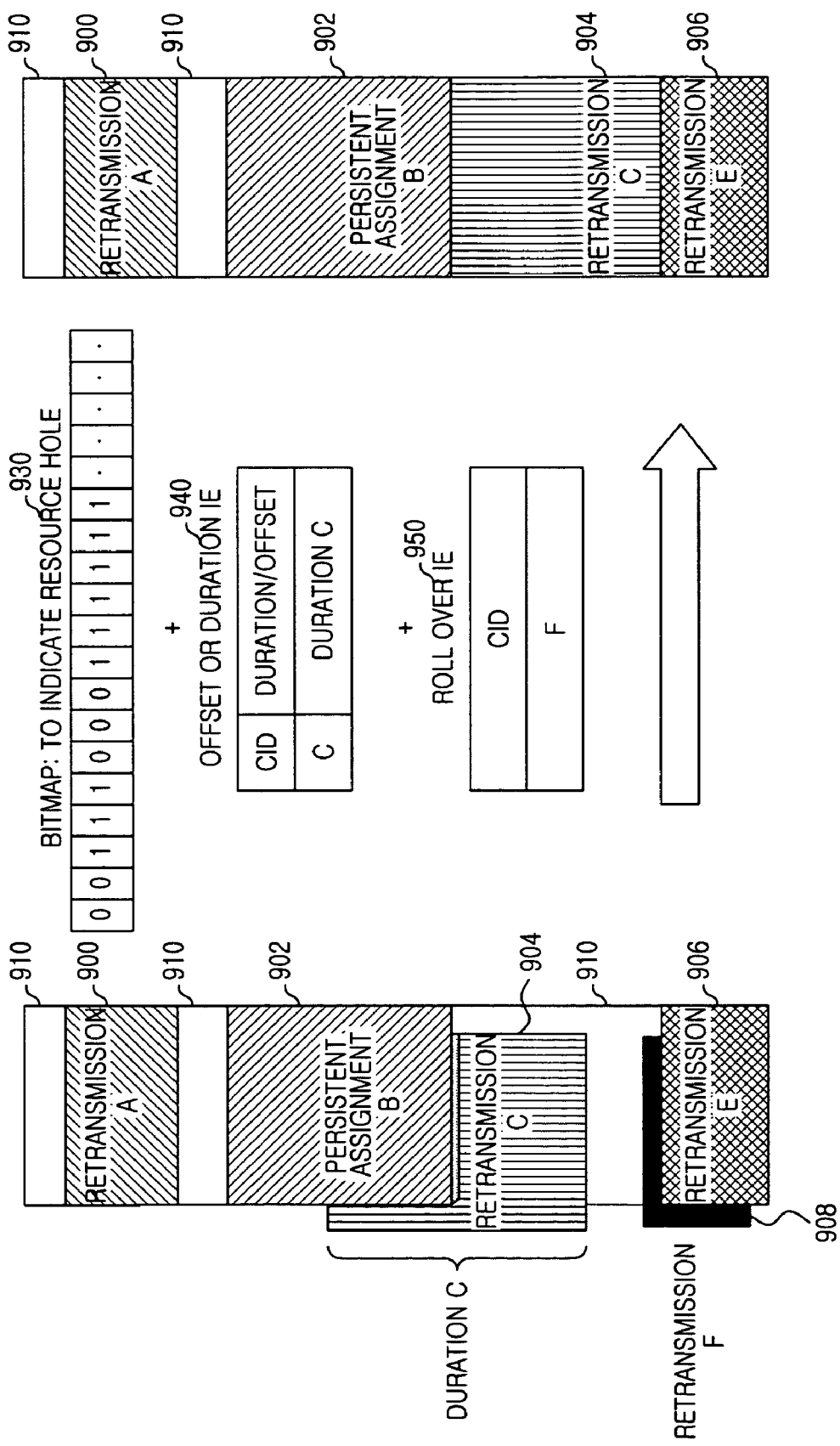
FIG. 9 illustrates a change of the fixed resource allocation when the roll-over is applied in the broadband wireless communication system according to an exemplary embodiment of the present invention.

If bitmap indicator = 1
Slot bitmap (length = # of total slots)
# of slot offsets or durations
For i=1: # of slot offsets or durations
Traffic ID
Slot offset or Duration
For i=1: # of roll over traffics
Traffic ID The control information for the resource allocation region includes a control information length, a bitmap, a slot offset/duration, and ID information of the rolled-over traffic. FIG. 9 illustrates the rolled-over fixed resource allocation.

In step 308, the base station transmits or receives data using the rolled-over fixed allocation resource in the rolled-over resource region.

Next, the base station finishes this process of determining the rolled-over resource.

In various implementations, the base station can provide not only the information relating to the rolled-over resource region but also information indicative of when the rolled-over resource region is transmitted.

When the total resource amount of the pre-allocated resource regions is greater than the total resource amount of the subframe, the rolled-over fixed resource allocation is illustrated in FIG. 3. Alternatively, when the required control information indicative of the resource allocated to other terminal because the corresponding resource region is excessively demanded and in some other cases, the fixed resource allocation region to be rolled over may be determined by taking into account the channel condition. As mentioned earlier, the fixed resource allocation region can be determined by applying the roll-over scheme to the synchronization system.

FIG. 4 illustrates a flowchart of operations of the terminal for the roll-over in the fixed resource allocation in the broadband wireless communication system according to an exemplary embodiment of the present invention.

The terminal uses the fixed resource allocation in step 400 and determines whether the corresponding fixed allocation resource is changed by the roll-over through the received roll-over indication message (see Table 2) in step 402.

When the corresponding fixed allocation resource is changed, the terminal waits to receive data during downlink or transmits data during uplink in the fixed allocation resource changed by the roll-over in step 404.

Next, the terminal finishes this process.

FIG. 5 illustrates a flowchart of operations of the base station for the roll-over in the fixed resource allocation in the broadband wireless communication system according to an exemplary embodiment of the present invention.

In step 500, the base station calculates the sum $N_a$ of the pre-allocated resources at the corresponding time.

If the sum $N_a$ of the pre-allocated resources is greater than the available slots of the current subframe in step 502, the base station temporarily cancels at least one fixed allocation resource according to a predefined rule in step 504. For example, one or more resource regions to be deallocated can be determined by ascending order of the size among the collided allocation resource regions until the sum becomes less than or equal to the total resource region allocable in the current subframe. Alternatively, one or more resource regions to be deallocated can be determined by the data priority.

By contrast, when the sum $N_a$ of the pre-allocated resources is equal to or less than the available slots of the current subframe in step 502, the base station operates in the corresponding mode.

In step 506, the base station transmits the control message including the information relating to the deallocated resource region (e.g., the corresponding traffic ID or the resource location for the corresponding traffic, temporary cancellation indicator) according to the corresponding rule to the corresponding terminal. The temporary cancellation indicator can be implemented using the type of the corresponding control information.

Next, the base station finishes this process.

Figure 6:
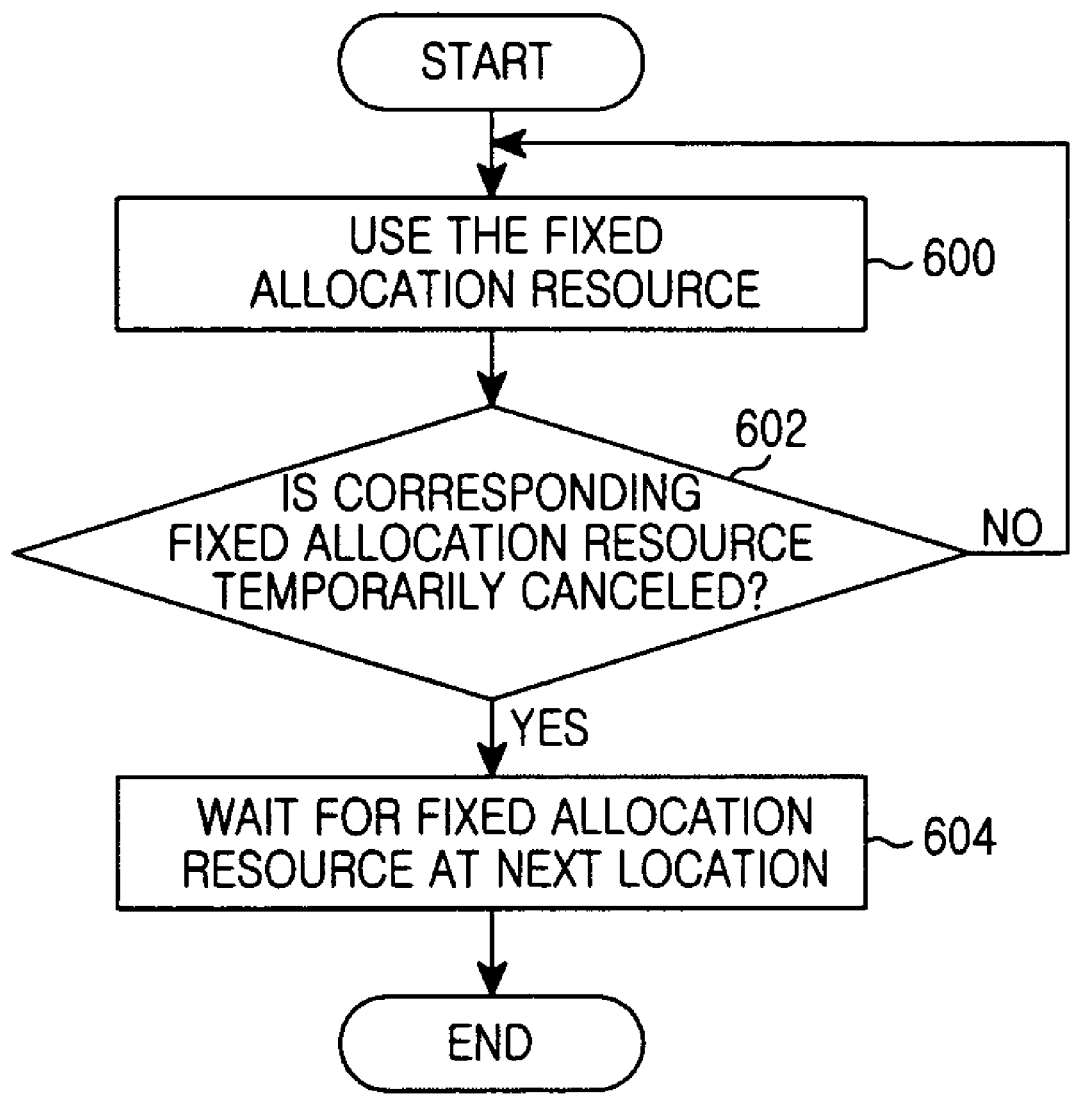
FIG. 6 illustrates operations of the terminal for the roll-over in the fixed resource allocation in the broadband wireless communication system according to an exemplary embodiment of the present invention.

FIG. 6 illustrates a flowchart of operations of the terminal for the roll-over in the fixed resource allocation in the broadband wireless communication system according to an exemplary embodiment of the present invention.

The terminal utilizes the fixed allocation resource in step 600 and determines whether the corresponding fixed allocation resource is temporarily canceled or not by referring to the information relating to the received resource region to be canceled in step 602.

When the corresponding fixed allocation resource is canceled, the terminal waits for the fixed allocation resource at the location corresponding to the next period of the current canceled fixed allocation resource in step 604. For example, when the fixed allocation resource is canceled for the n-th corresponding frame of the fixed allocation resources of 10 frame cycle, the terminal receives or transmits data in the next (n+10)-th frame.

Next, the terminal finishes this process.

Figure 7:
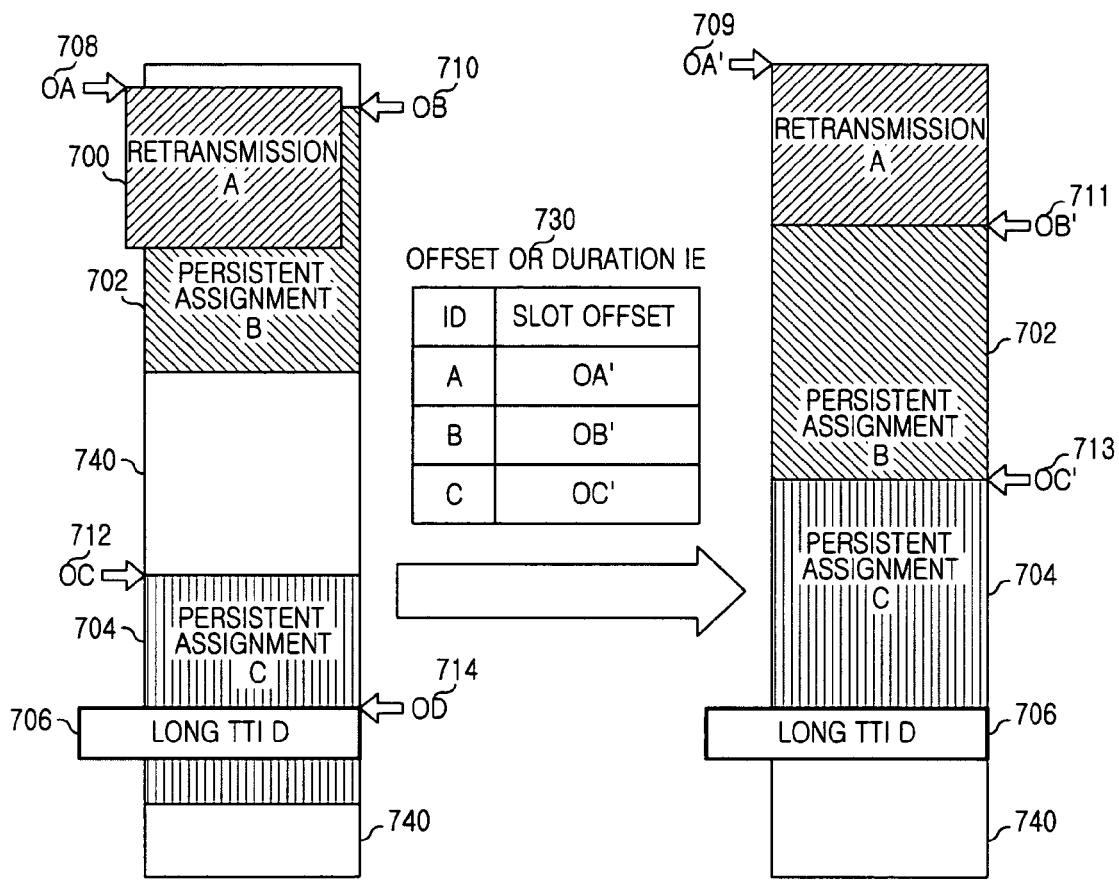
FIG. 7 illustrates a change of the fixed resource allocation region in the broadband wireless communication system according to an exemplary embodiment of the present invention.

FIG. 7 illustrates a change of the fixed resource allocation region in the broadband wireless communication system according to an exemplary embodiment of the present invention.

The entire resource is divided into small resource regions (hereafter, referred to as slots), and a unique index is given to each resource region. The base station can inform of the resource allocation of the particular region through the slot offset and duration information with respect to a specific traffic of a particular terminal. However, when informing of the resource region allocated per time (hereafter, a minimum unit of the time region for the resource allocation is referred to as a subframe), the base station transmits too many control signals and thus deteriorates the transmission efficiency. Thus, the region once allocated is reused after a particular subframe without any control information. The reuse of the region pre-allocated to the particular user in the particular subframe without any control information is referred to as the fixed resource allocation.

The fixed resource allocation, which reuses the region pre-allocated to the particular user in the particular subframe without any control information, is conducted in the following cases.

In the data transmission for Hybrid Automatic Repeat Request (HARQ) retransmission, the resource region previously used is reused (Retransmission). The resource allocated to a particular subframe is effective for successive subframes (Long TTI). The subframe of a particular period is persistently allocated to a particular user (Persistent allocation).

However, disadvantageously, the particular resource region of the current subframe is fixedly allocated to multiple terminals in advance, which is referred to as resource collision. In this case, the multiple allocation resource regions collided need to be shifted to other resource regions, and their changed locations need to be provided to the user terminals using the control message.

For example, as for the resource collision in the fixed resource allocation according to the first method, a resource region 700 for Retransmission A which starts at the point OA 708 collides with a resource region 702 for Persistent allocation B which starts at the point OB 710 in the m-th subframe. A resource region 704 for Persistent allocation C which starts at the point OC 712 collides with a resource region 706 for Long TTI in the m-th subframe. The resource region 706 starts at the point OD 714. The resource region 740 is an unallocated resource region.

To avoid the collisions of the allocation resource regions 700, 702 and 704, the start point OA 708 of the resource region 700 for the Retransmission A is shifted to OA' 709, the start point of the resource region 702 for the Persistent allocation B is shifted to OB' 711, and the start point of the resource region 704 for the Persistent allocation C is shifted to OC' 713. While there is no need to change the start point of the resource region 706 for the Long TTI in this example, it may be altered in some cases.

The first method transmits the fixed allocation IE message including the information (OA→OA', OB→OB', and OC→OC') changed by the slot offset 730 to the corresponding terminal (see Table 1).

Figure 8:
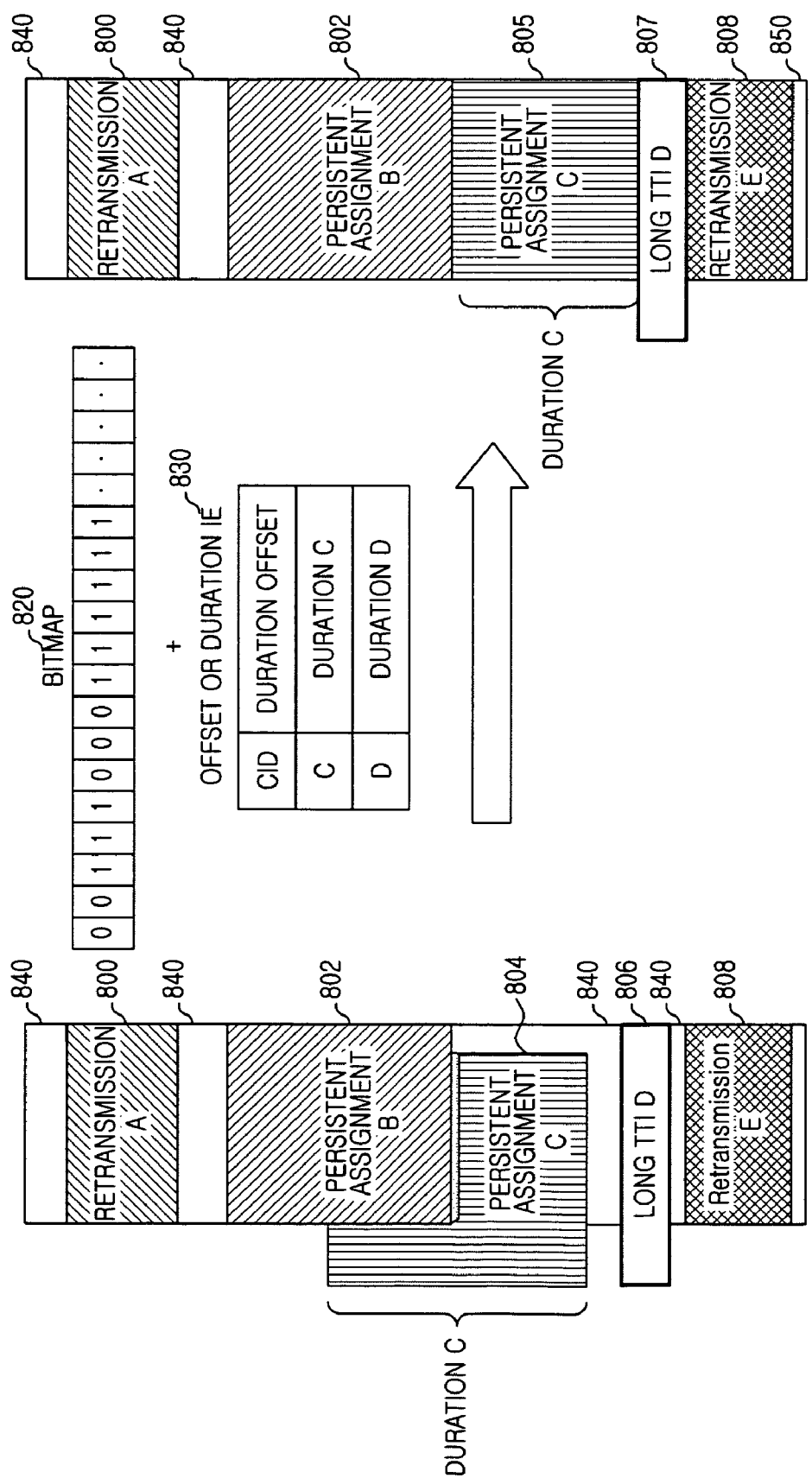
FIG. 8 illustrates a change of the fixed resource allocation region in the broadband wireless communication system according to another exemplary embodiment of the present invention.

FIG. 8 illustrates a change of the fixed resource allocation region in the broadband wireless communication system according to an exemplary embodiment of the present invention.

As for the resource collision in the fixed resource allocation according to the second method, when a resource region 800 for Retransmission A, a resource region 802 for Persistent allocation B, a resource region 804 for Persistent allocation C, a resource region 806 for Long TTI D, and a resource region 808 for Retransmission E are fixedly resource allocated in the m-th subframe, the resource region 802 for Persistent allocation B and the resource region 804 for Persistent allocation C collide with each other. A resource region 840 is an unallocated resource region.

The second method informs of the change of the fixed resource allocation regions by transmitting the bitmap indicative of the unallocated resources which can be filled with the collided resource regions and the pre-allocated resource regions, the traffic ID (Persistent allocation C, Long TTI D) requiring the resource allocation change, and the number of the allocated slots (or duration).

In the fixed resource allocation change of the second method, resource collision is prevented by sustaining the resource regions for Retransmission A 800, Persistent allocation B 802, and Retransmission E 808 and shifting the resource regions for Persistent allocation C 804 and Long TTI D 806 to Persistent allocation C 805 and Long TTI D 807, respectively, using the bitmap information 820 and the duration 830.

The first method changes the location information of all the resource regions excluding one resource region among the collided resource regions, whereas the second method sustains the resource regions without changing them at maximum and changes the collided other resource regions using the other resource regions. Thus, in some cases, the second method can transmit the fixed resource allocation information with less information than the first method.

FIG. 9 illustrates a change of the fixed resource allocation when the roll-over is applied in the broadband wireless communication system according to an exemplary embodiment of the present invention.

When the entire resource is fixedly allocated as a resource region 900 for Retransmission A, a resource region 902 for Persistent Allocation B, a resource region 904 for Retransmission C, a resource region 906 for Retransmission E, and a resource region 908 for Retransmission F in the m-th subframe, the resource region 902 for Persistent allocation B collides with the resource region 904 for Retransmission C. Also, it is assumed that the resource region 906 for Retransmission E collides with the resource region 908 for Retransmission F. A resource region 910 is an unallocated resource region.

When the sum of the fixedly allocated resources of the m-th frame is greater than the total available resource of the current subframe, the resource region 908 for Retransmission F to be rolled over is selected and canceled by ascending order of the size. The canceled resource region 908 for Retransmission F is allocated to the next (m+1)-th subframe or the (m+n)-th subframe. Alternatively, the canceled resource region can be allocated to the next subframe of a particular period.

For doing so, the changed resource regions are provided using the bitmap 930 and the duration information 940 as in the fixed resource allocation of the second method, and the rolled-over resource region is provided using the roll over IE information 950. Alternatively, when the controlled quantity of the fixed resource allocation change is quite less in the first method, the information may be provided using the control information of the first method and the roll over IE information 950.

As such, when the pre-allocated fixed resource region is changed in the n-th frame according to the first or second method, the traffic is transmitted over the changed region in the (n+1)-th subframe as well. For example, in the synchronous HARQ retransmission, when a packet is retransmitted over the changed resource allocation region and not successfully received, the packet is retransmitted over the changed resource allocation region again. In the fixed resource allocation in a certain cycle, packets are transmitted over the changed region after the resource region change.

When the roll over delays the cycle of the fixed resource allocation by a certain number of subframes, sequent time intervals of the fixed resource allocation can be also delayed by the certain number of the subframes.

Alternatively, when the changed fixed resource allocation region is effective only in the current subframe and fixedly allocated in the next subframe, the present invention is applicable to a method that uses the pre-allocated resource region (the fixed resource allocation not yet changed).

Figure 10:
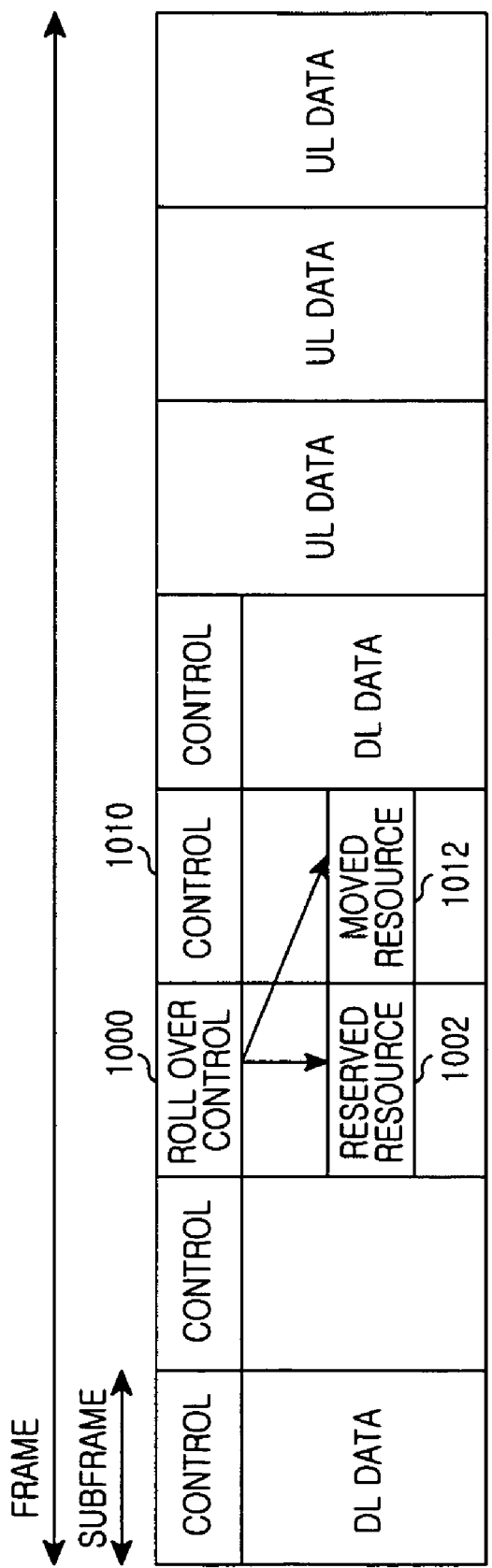
FIG. 10 illustrates a resource location change for the rolled-over fixed resource allocation resource according to one exemplary embodiment of the present invention.

FIG. 10 illustrates a resource location change for the rolled-over fixed resource allocation resource according to one exemplary embodiment of the present invention.

In the corresponding frame including a plurality of subframes in FIG. 10, when the resource region 1002 of the N-th subframe 1000 is rolled over, the rolled-over resource region 1002 moves to the same location 1012 of the next subframe (that is, the (N+1)-th subframe 1010). In so doing, the traffic ID corresponding to the resource region or the pre-allocated resource location, and the indication information indicative of the movement to the same location of the next subframe are needed.

Figure 11:
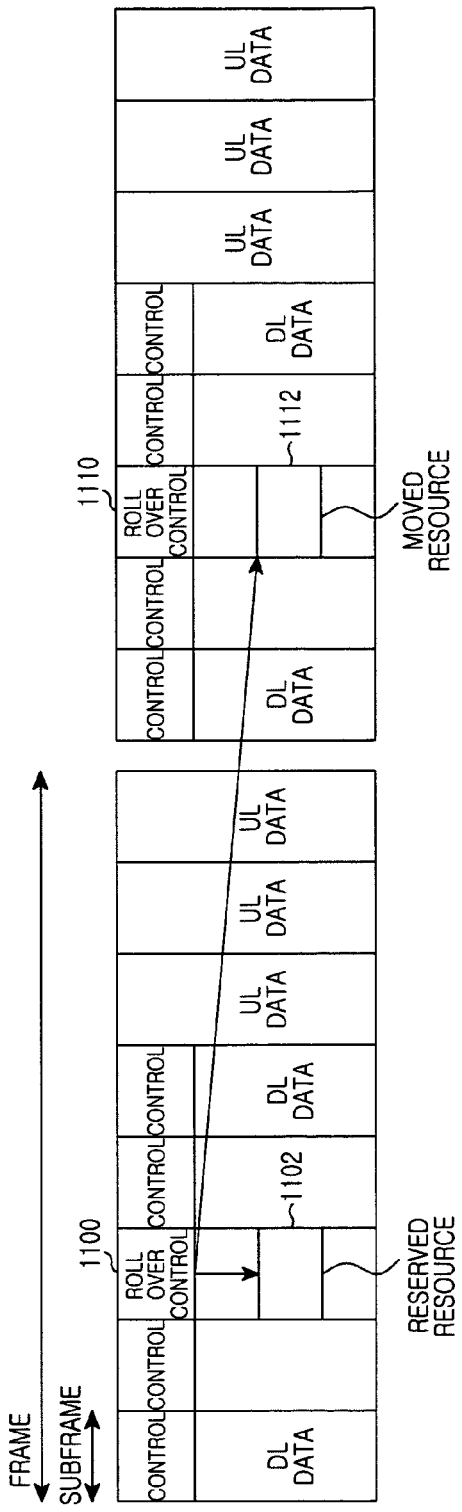
FIG. 11 illustrates a resource location change for the rolled-over fixed resource allocation resource according to another exemplary embodiment of the present invention.

FIG. 11 illustrates a resource location change for the rolled-over fixed resource allocation resource according to another exemplary embodiment of the present invention.

When the resource region 1102 of the N-th subframe 1100 is rolled over in the corresponding frame including a plurality of subframes in FIG. 11, the rolled-over resource region 1102 moves to the same location 1112 of the N-th subframe 1110 of the next frame. In so doing, the traffic ID corresponding to the resource region or the pre-allocated resource location, and the indication information indicative of the movement to the same location of the next subframe are needed.

Figure 12:
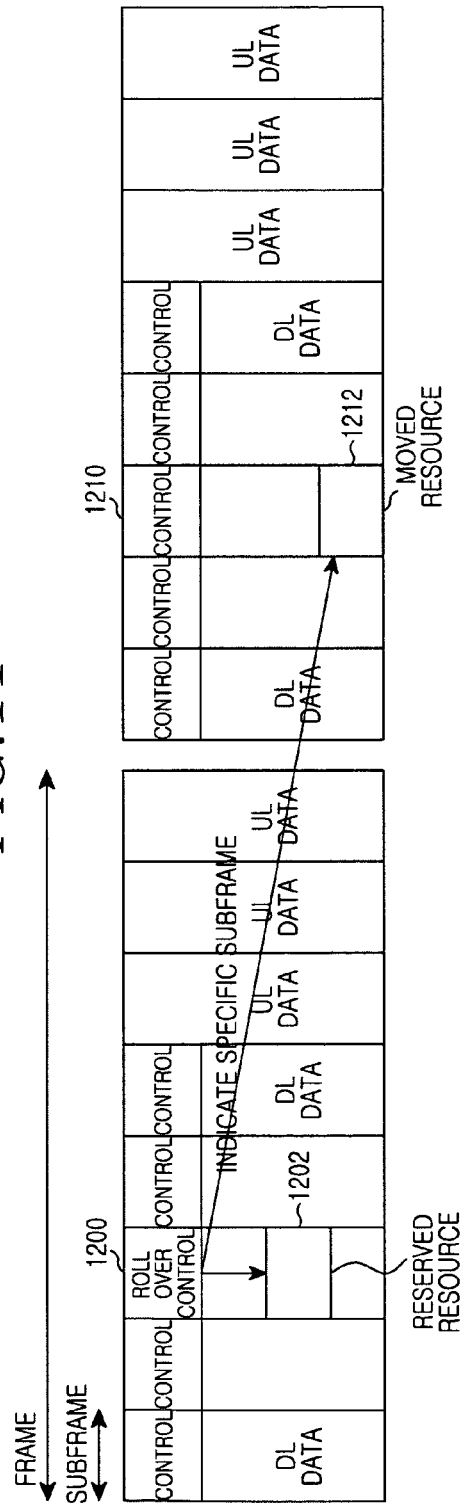
FIG. 12 illustrates a resource location change for the rolled-over fixed resource allocation resource according to yet another exemplary embodiment of the present invention.

FIG. 12 illustrates a resource location change for the rolled-over fixed resource allocation resource according to yet another exemplary embodiment of the present invention.

When the resource region 1202 of the N-th subframe 1200 is rolled over in the corresponding frame including a plurality of subframes in FIG. 12, the rolled-over resource region 1202 moves to a certain subframe 1210 of the next frame 1212. In so doing, the traffic ID corresponding to the resource region or the pre-allocated resource location, the rolled-over subframe index, and the changed resource location information (the resource region offset in the certain subframe 1210 of the next frame) are further provided.

Figure 13:
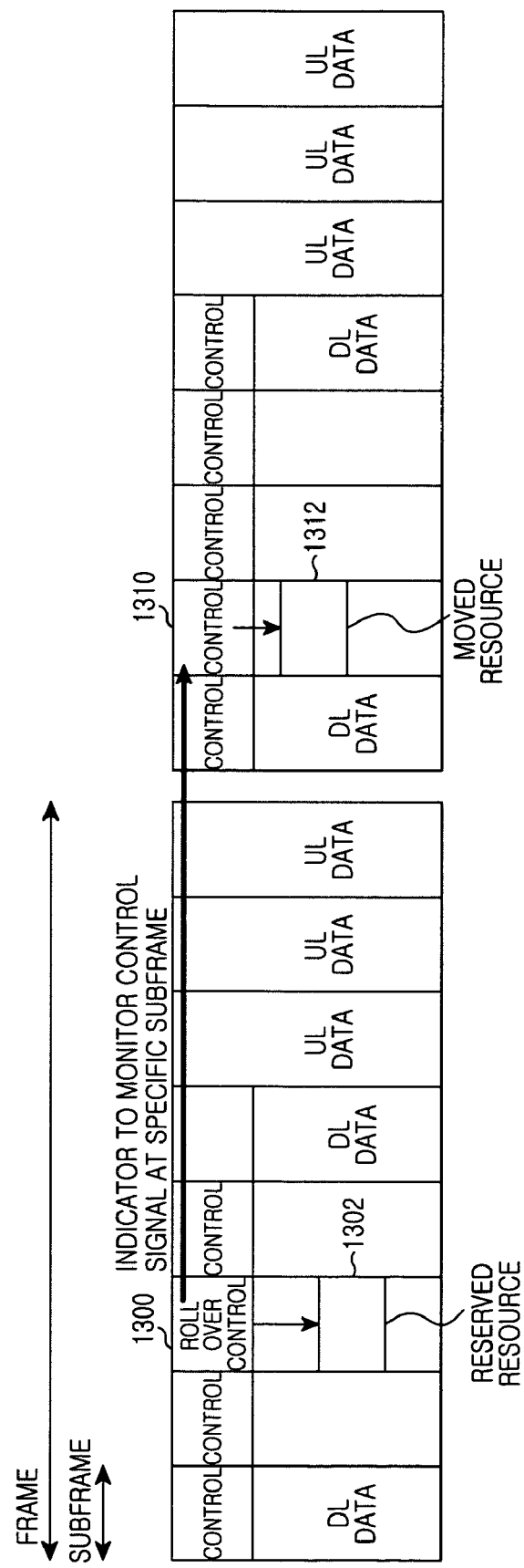
FIG. 13 illustrates a resource location change for the rolled-over fixed resource allocation resource according to still another exemplary embodiment of the present invention.

FIG. 13 illustrates a resource location change for the rolled-over fixed resource allocation resource according to still another exemplary embodiment of the present invention.

When the resource region 1302 of the N-th subframe 1300 is rolled over in the corresponding frame including a plurality of subframes in FIG. 13, the base station indicates the temporary cancellation of the resource to be used and instructs the terminal to monitor the control information of a specific subframe 1310. The terminal can monitor the control information of the specific subframe pre-designated without the index of the specific subframe. Alternatively, the terminal can monitor the control information of the corresponding subframe by designating the specific subframe. New resource is allocated in the corresponding subframe through the control information 1312.

To minimize the control information receive power of the terminal, the terminal can enter a sleep mode to monitor the control information only in the specific subframe and sleep in other subframes. When receiving the control information of FIG. 13, exclusively, the terminal monitors the control information by switching from the sleep mode to an active mode in the corresponding subframe.

Figure 14:
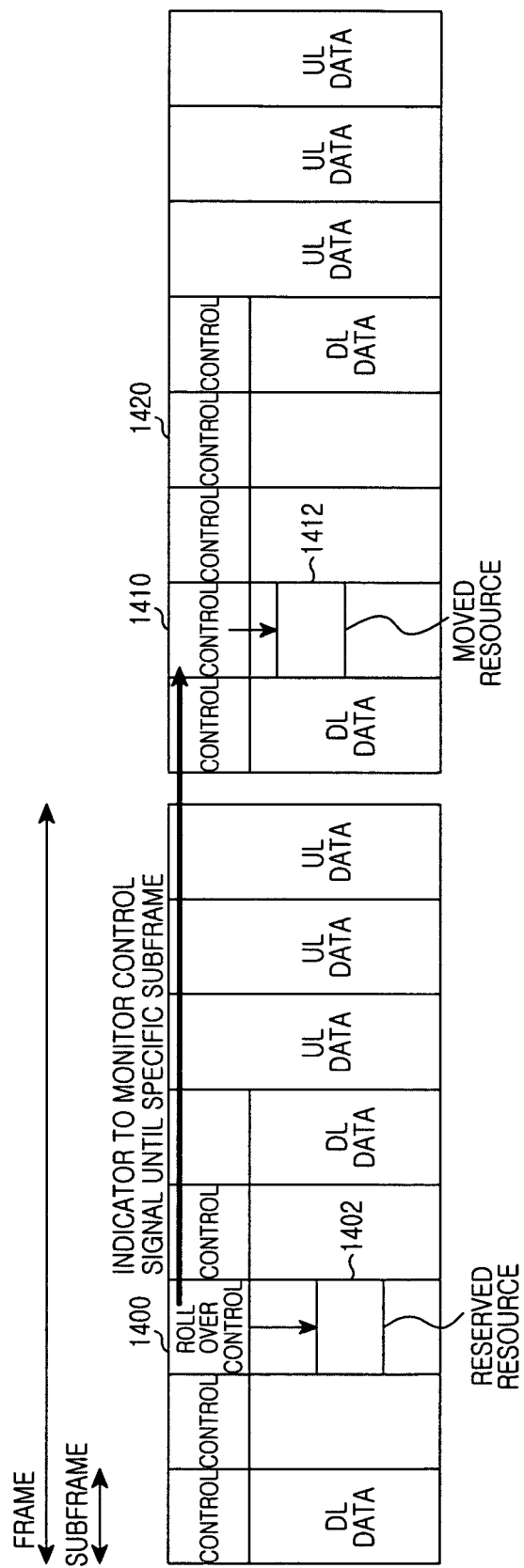
FIG. 14 illustrates a resource location change for the rolled-over fixed resource allocation resource according to still another exemplary embodiment of the present invention.

FIG. 14 illustrates a location change of the rolled-over fixed allocation resource according to a still another exemplary embodiment of the present invention.

When the fixed allocation resource, in a resource region 1402 of the N-th subframe 1400 of a frame including a plurality of subframes, is rolled over, the base station, in an information of a roll-over control of the N-th subframe 1400, indicates a temporary cancellation of use of the fixed allocation resource and instructs the terminal to monitor a plurality of control information from the N-th subframe 1400 to a subframe 1420 which is a maximum available subframe in which the rolled-over fixed allocation resource can be allocated.

The terminal monitors a plurality of control information from the N-th subframe 1400 to the subframe 1420 to find the subframe in which the rolled-over fixed allocation resource is allocated using the control information of the plurality of sub-frames which are from the N-th subframe 1400 to the subframe 1420.

That is, the base station allocates resource to be rolled over between the N-th subframe 1400 and the subframe 1420 which is the maximum available subframe in which the rolled-over fixed allocation resource can be allocated.

Also, the maximum available subframe in which the rolled-over fixed allocation resource can be allocated is determined according to a maximum HARQ retransmission time when the rolled-over fixed allocation resource is for a synchronous HARQ retransmission. FIG. 15 illustrates a timing of the previous periodic resource allocation according to the roll-over scheme according to an exemplary embodiment of the present invention.

Fixed allocation resources 1500, 1510, and 1520 are assigned to the corresponding subframes in a certain cycle 1502. When the fixed allocation resource 1510 is rolled over, the fixed allocation resource 1510 is moved by the corresponding rule 1512 (FIGS. 10 through 14). Next, in the next period, the fixed allocation resource 1520 is also moved according to the corresponding rule regardless of the roll-over 1522.

That is, the previous period resource allocation after the roll-over moves the corresponding fixed allocation resource regardless of the roll-over.

FIG. 16 illustrates a timing of the previous periodic resource allocation according to the roll-over scheme according to another exemplary embodiment of the present invention.

Fixed allocation resources 1600, 1610, and 1620 are assigned to the corresponding subframes in a certain period 1602. When the fixed allocation resource 1610 is rolled over, the fixed allocation resource 1610 is moved according to the corresponding rule 1612 (FIGS. 10 through 14). Next, in the next period, the fixed allocation resource 1620 is not affected by the previous roll-overs 1610 and 1612.

That is, when there is no next roll-over, the roll-over in the particular subframe does not exert influence on the next periodic resource allocation.

Figure 17:
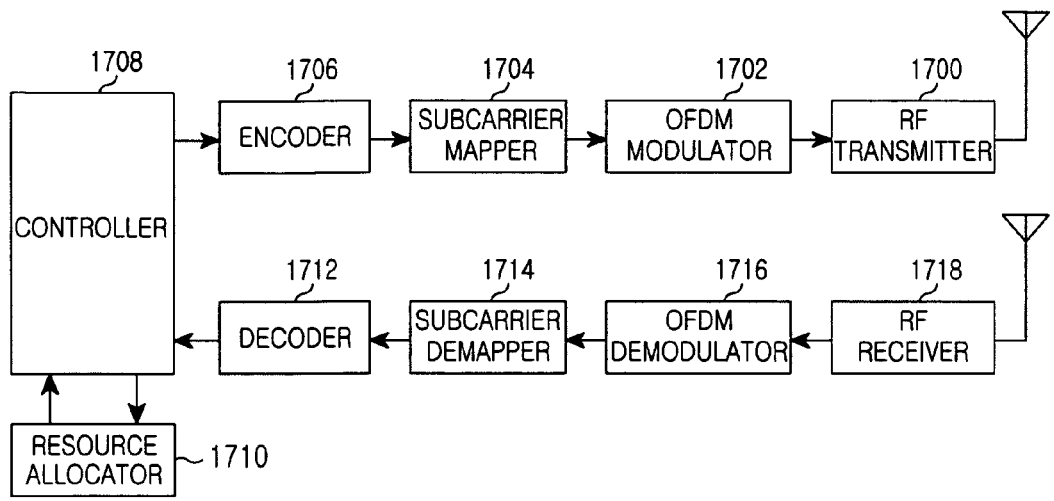
FIG. 17 illustrates a base station for changing the fixed resource allocation region in the broadband wireless communication system according to an exemplary embodiment of the present invention.

FIG. 17 illustrates a block diagram of a base station for changing the fixed resource allocation region in the broadband wireless communication system according to an exemplary embodiment of the present invention.

The base station of FIG. 17 includes a Radio Frequency (RF) transmitter 1700, an OFDM modulator 1702, a subcarrier mapper 1704, an encoder 1706, a controller 1608, a resource allocator 1710, a decoder 1712, a subcarrier demapper 1714, an OFDM demodulator 1716, and an RF receiver 1718.

The resource allocator 1710 allocates the radio resources to the terminals. Particularly, the resource allocator 1710 determines the fixed resource allocation region in the frame, determines the location of the radio resource to be allocated to the terminal, and primarily allocates the radio resources. The detailed resource allocation function of the resource allocator 1710 differs in various embodiments of the present invention, which shall be described in further detail after the general functions of the component blocks are explained.

The encoder 1706 encodes and modulates the bit stream provided from the controller 1608 and converts to complex symbols.

The subcarrier mapper 1704 maps the complex symbols output from the encoder 1706 to the subcarriers according to the result of the resource allocation of the resource allocator 1710. The OFDM modulator 1702 converts the signals per subcarrier output from the subcarrier mapper 1704 to a time-domain signal through Inverse Fast Fourier Transform (IFFT) operation, and constitutes OFDM symbols by inserting a Cyclic Prefix (CP). The RF transmitter 1700 up-converts the baseband signal output from the OFDM modulator 1702 to an RF signal and transmits the RF signal via an antenna.

The RF receiver 1718 down-converts an RF signal received via an antenna to a baseband signal. The OFDM demodulator 1716 classifies the signal output from the RF receiver 1618 based on the OFDM symbol, removes the CP, and restores the signals per subcarrier through a FFT operation. The subcarrier demapper 1714 classifies the signals per subcarrier output from the OFDM demodulator 1716 based on the processing unit. The decoder 1712 demodulates and decodes the signals output from the subcarrier demapper 1714, and converts them to the bit stream.

In the operations of the base station, the resource allocator 1710 determines whether the resource release and change is necessary or not in the fixed resource allocation region. When there is no need to release and change the resource, the resource allocator 1710 sustains the existing resource allocation regions.

When the resource release and change is required, the resource allocator 1710 calculates the control information amounts $B_b$ and $B_s$ required to release and change the resource when the first method and the second method are adopted respectively. Herein, $B_b$ denotes the control information amount required for the first method and $B_s$ denotes the control information amount required for the second method. The first method and the second method have been explained in FIGS. 4 and 5.

The resource allocator 1710 compares the information amount $B_s$ required for the resource release or change of the second method with the information amount $B_b$ required for the resource release or change of the first method. When $B_s$ is greater than $B_b$, the resource allocator 1710 releases or changes the resource using the first method. When $B_s$ is less than $B_b$, the resource allocator 1610 releases or changes the resource using the second method. When $B_s$ is equal to $B_b$, the resource allocator 1710 can release or change the resource by arbitrarily selecting either the first method or the second method as the default value.

The controller 1708 transmits the fixed allocation IE message including the resource release and resource change information. Herein, the control information contained in the fixed allocation IE message can be transmitted through the joint coding decodable by every user, or through the separate coding decodable only by particular user(s). The fixed allocation IE message format is shown in Table 1.

The encoder 1706 encodes and modulates the fixed allocation IE message output from the controller 1708. Next, the fixed allocation IE message passes through the subcarrier mapper 1704, the OFDM modulator 1702, and the RF transmitter 1700, and then multicast to the terminals compliant with the fixed resource allocation.

Referring back to FIG. 3, the controller 1708 computes the sum of the fixed resource allocation regions during a certain time for the resource allocation. When the sum of the fixed resource allocation regions is greater than the currently available resource allocation regions, the controller 1708 selects the resource regions to be rolled over by ascending order of the size so as to make the total fixed resource allocation region less than or equal to the currently available resource allocation regions. The resource allocator 1710 changes the resource allocation regions while excluding the rolled-over resource regions.

FIG. 17 is a block diagram of a terminal for changing the fixed resource allocation region in the broadband wireless communication system according to an exemplary embodiment of the present invention.

Figure 18:
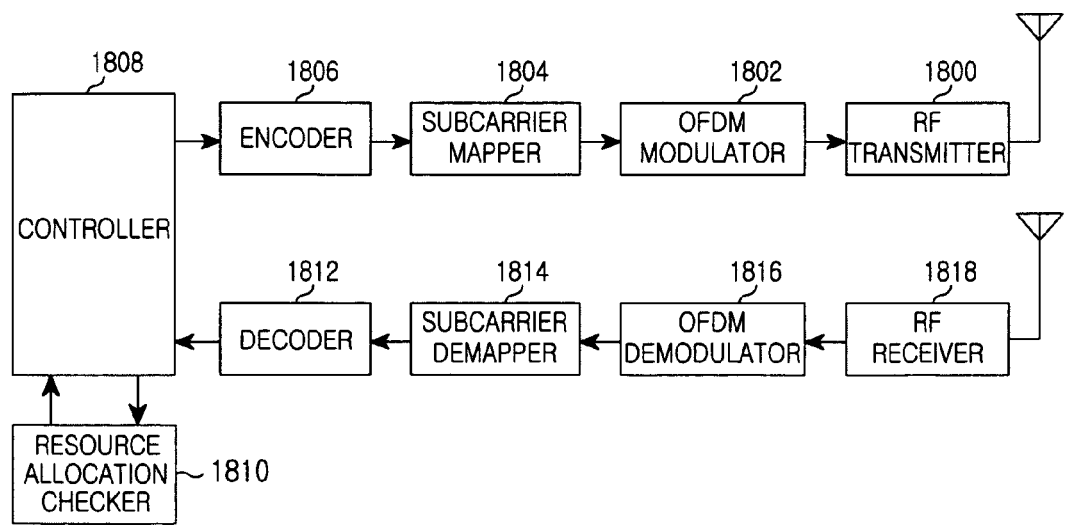
FIG. 18 illustrates a terminal for changing the fixed resource allocation region in the broadband wireless communication system according to an exemplary embodiment of the present invention.

The terminal of FIG. 18 includes an RF transmitter 1800, an OFDM modulator 1802, a subcarrier mapper 1804, an encoder 1806, a controller 1808, a resource allocation checker 1810, a decoder 1812, a subcarrier demapper 1814, an OFDM demodulator 1816, and an RF receiver 1818. The components of the terminal, except for the resource allocation checker 1810, are substantially the same as those of the base station and shall not be further explained here.

Upon receiving the fixed allocation IE message, the resource allocation checker 1810 confirms the resource release or resource change information (see Table 1). According to the bitmap indicator information in the fixed allocation IE message, the resource allocation checker 1810 releases or changes its allocated resource using the first or second method. The controller 1808 communicates with the base station according to the result of the changed fixed resource allocation.

As described above, by comparing the control information amounts required for the resource change in the resource collision in the mobile communication system, the location of the fixed resource allocation region can be efficiently changed by use of the minimum control information.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An operating method of a base station for changing a fixed resource allocation to reduce overhead in a mobile communication system, the method comprising:
    calculating necessary amounts of control information with respect to at least two resource allocation changing methods when there is need to change the fixed resource allocation;
    selecting a resource allocation changing method which requires a least amount of control information; and
    transmitting a control information required for the resource allocation change to at least one terminal.

2. The operating method of claim 1, wherein the control information is transmitted through a joint coding decodable by all users, or through a separate coding decodable only by particular users.

3. The operating method of claim 1, wherein one of the resource allocation region changing methods changes slot offsets of other allocation resources excluding one of collided resource regions to avoid collision.

4. The operating method of claim 1, wherein one of the resource allocation region changing methods allocates other allocation resource, excluding pre-allocated resources comprising one of collided resource regions, to un-allocated resource regions in sequence.

5. The operating method of claim 1, wherein the control information comprises at least one of a bitmap indicative of pre-allocated resource regions and un-allocated resource regions, a traffic Identifier (ID), a slot offset, a slot duration, and an indicator indicative of the resource allocation changing method.

6. An operating method of a terminal for changing a fixed resource allocation to reduce overhead in a mobile communication system, the method comprising:
    determining a corresponding resource allocation changing method upon receiving a fixed allocation change control message;
    determining a location of a fixed allocation resource changed according to the corresponding resource allocation changing method; and
    at least one of receiving or transmitting a corresponding traffic from the location of the changed fixed allocation resource.

7. The operating method of claim 6, wherein the fixed allocation change control message comprises at least one of a bitmap indicative of pre-allocated resource regions and un-allocated resource regions, a traffic Identifier (ID), a slot offset, a slot duration, and an indicator indicative of the resource allocation changing method.

8. An apparatus of a base station for changing a fixed resource allocation to reduce overhead in a mobile communication system, the apparatus comprising:
    a controller configured to calculate necessary amounts of control information with respect to at least two resource allocation changing methods when there is need to change the fixed resource allocation; and
    a resource allocator configured to select a resource allocation changing method which requires a least amount of control information, and transmitting a message comprising control information required for the resource allocation change to at least one terminal.

9. The apparatus of claim 8, wherein the control information in the message is transmitted through a joint coding decodable by all users, or through a separate coding decodable only by particular users.

10. The apparatus of claim 8, wherein one of the resource allocation region changing methods changes slot offsets of other allocation resources excluding one of collided resource regions to avoid collision.

11. The apparatus of claim 8, wherein one of the resource allocation region changing methods allocates other allocation resource, excluding pre-allocated resources comprising one of collided resource regions to un-allocated resource regions in sequence.

12. The apparatus of claim 8, wherein the control information comprises at least one of a bitmap indicative of pre-allocated resource regions and un-allocated resource regions, a traffic Identifier (ID), a slot offset, a slot duration, and an indicator indicative of the resource allocation changing method.

13. An apparatus of a terminal for changing a fixed resource allocation to reduce overhead in a mobile communication system, the apparatus comprising:
    a resource allocation checker configured to determine a corresponding resource allocation changing method and a location of a fixed allocation resource changed according to the corresponding resource allocation changing method when receiving a fixed allocation change control message; and
    a controller configured to receive a corresponding traffic from the location of the changed fixed allocation resource.

14. The apparatus of claim 13, wherein the fixed allocation change control message comprises at least one of a bitmap indicative of pre-allocated resource regions and un-allocated resource regions, a traffic Identifier (ID), a slot offset, a slot duration, and an indicator indicative of the resource allocation changing method.

15. An operating method of a base station for changing a fixed resource allocation to reduce overhead in a mobile communication system, the method comprising:
    temporarily canceling one or more corresponding fixed allocation in a period of a corresponding fixed allocation resource; and
    reallocating the one or more canceled fixed allocation resources according to a corresponding rule.

16. The operating method of claim 15, further comprising:
    transmitting a control information relating to the one or more fixed allocation resources temporarily canceled to a corresponding terminal.

17. The operating method of claim 15, wherein the reallocating of the one or more canceled fixed allocation resources according to the corresponding rule comprises:

moving the one or more fixed allocation resources temporarily canceled to corresponding subframes of a next fixed allocation resource period, wherein an index of a subframe for the temporarily canceled fixed allocation resource is equal to an index of a subframe for the moved fixed allocation resource.

18. The operating method of claim 15, wherein the reallocating of the one or more canceled fixed allocation resources according to the corresponding rule comprises:

within a frame comprising a first subframe corresponding to the temporarily canceled fixed allocation resource, moving the temporarily canceled fixed allocation resource to a next subframe of the first subframe.

19. The operating method of claim 15, wherein the reallocating of the one or more canceled fixed allocation resources according to the corresponding rule comprises:

in the corresponding fixed allocation resource period corresponding to the temporarily canceled fixed allocation resource, moving the temporarily canceled fixed allocation resource to a second subframe of a next frame of a frame comprising a first subframe corresponding to the temporarily canceled fixed allocation resource, wherein the first subframe and the second subframe have the same subframe index or different subframe indexes.

20. The operating method of claim 15, wherein the reallocating of the one or more canceled fixed allocation resources according to the corresponding rule comprises:

moving the temporarily canceled fixed allocation resource to a particular subframe.

21. The operating method of claim 15, wherein the reallocating of the one or more canceled fixed allocation resources according to the corresponding rule comprises:

reallocating the one or more canceled fixed allocation resources using control information of a particular subframe pre-designated.

22. The operating method of claim 15, wherein the temporarily canceled fixed allocation resource is reallocated only in the corresponding fixed allocation resource period, and the fixed allocation resource is not reallocated unless a total amount of resources allocated to the corresponding subframe is greater than a threshold after the corresponding fixed allocation resource period.

23. The operating method of claim 15, wherein the temporarily canceled fixed allocation resource is reallocated only in the corresponding fixed allocation resource period, and the fixed allocation resource is allocated in every fixed allocation period even after the corresponding fixed allocation resource cycle according to the same rule regardless of a total amount of resources allocated to the corresponding subframe.

24. The operating method of claim 15, wherein the reallocating of the one or more canceled fixed allocation resources according to the corresponding rule comprises:

reallocating the one or more canceled fixed allocation resources using at least one subframe among subframes between a subframe in which the fixed allocation resources are cancelled and a certain subframe.

25. An operating method of a terminal for changing a fixed resource allocation to reduce overhead in a mobile communication system, the method comprising:

receiving information to change a fixed allocation resource in a corresponding fixed allocation resource period;

determining a location of a fixed allocation resource changed by a corresponding rule based on the information to change the fixed allocation resource; and at least one of receiving or transmitting traffic in the changed fixed allocation resource location.

26. The operating method of claim 25, wherein the locating of the fixed allocation resource changed by the corresponding rule comprises:

determining a location of a resource in a next subframe of a subframe corresponding to a temporarily canceled fixed allocation resource.

27. The operating method of claim 25, wherein the locating of the fixed allocation resource changed by the corresponding rule comprises:

determining a location of a resource in the same subframe of a next frame of a frame comprising a subframe corresponding to a temporarily canceled fixed allocation resource.

28. The operating method of claim 25, wherein the locating of the fixed allocation resource changed by the corresponding rule comprises:

determining a location of a resource in a particular subframe.

29. The operating method of claim 25, wherein determining a location of a fixed allocation resource changed by the corresponding rule comprises:

receiving control information of a particular subframe pre-designated; and determining a locate of a resource newly allocated using the control information.

30. The operating method of claim 25, wherein the locating of the fixed allocation resource changed by the corresponding rule comprises:

determining a location of the fixed allocation resource in at least one subframe among subframes between a subframe in which the fixed allocation resources are cancelled and a certain subframe.

* * * * *